United States Patent
Furman, Jr. et al.

(10) Patent No.: US 9,574,119 B2
(45) Date of Patent: Feb. 21, 2017

(54) METHOD OF PRODUCING CREPING ADHESIVE

(71) Applicant: NALCO COMPANY, Naperville, IL (US)

(72) Inventors: Gary S. Furman, Jr., St. Charles, IL (US); Mingli Wei, Naperville, IL (US); Christopher D. Kaley, Naperville, IL (US); David J. Castro, DeKalb, IL (US); Vladimir A. Grigoriev, Atlanta, GA (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 15/018,396

(22) Filed: Feb. 8, 2016

(65) Prior Publication Data

US 2016/0152878 A1 Jun. 2, 2016

Related U.S. Application Data

(60) Division of application No. 13/656,793, filed on Oct. 22, 2012, now Pat. No. 9,266,301, which is a continuation-in-part of application No. 11/172,079, filed on Jun. 30, 2005, now Pat. No. 8,293,073.

(51) Int. Cl.
| | |
|---|---|
| *C09J 139/02* | (2006.01) |
| *B31F 1/14* | (2006.01) |
| *C09J 9/00* | (2006.01) |
| *C08L 29/04* | (2006.01) |
| *C08L 39/00* | (2006.01) |
| *C08L 39/02* | (2006.01) |
| *C08L 77/00* | (2006.01) |
| *C08L 79/02* | (2006.01) |

(52) U.S. Cl.
CPC .............. *C09J 139/02* (2013.01); *B31F 1/14* (2013.01); *C08L 29/04* (2013.01); *C08L 39/00* (2013.01); *C08L 39/02* (2013.01); *C09J 9/00* (2013.01); *C08L 77/00* (2013.01); *C08L 79/02* (2013.01)

(58) Field of Classification Search
CPC ... B31F 1/14; C09J 139/02; C09J 9/00; C08L 29/04; C08L 39/00; C08L 39/02; C08L 2666/68; C08L 2666/70; C08L 2666/78; C08L 2666/829
See application file for complete search history.

(56) References Cited

U.S. PATENT DOCUMENTS

| | | |
|---|---|---|
| 2,182,306 A | 12/1939 | Ulrich et al. |
| 3,251,778 A | 5/1966 | Dickson et al. |
| 3,301,746 A | 1/1967 | Sanford et al. |
| 3,640,841 A | 2/1972 | Winslow et al. |
| 3,905,863 A | 9/1975 | Ayers |
| 3,994,771 A | 11/1976 | Rich et al. |
| 4,102,737 A | 7/1978 | Morton et al. |
| 4,529,480 A | 7/1985 | Trokhan et al. |
| 5,048,589 A | 9/1991 | Cook et al. |
| 5,232,553 A | 8/1993 | Smigo et al. |
| 5,281,307 A | 1/1994 | Smigo et al. |
| 5,374,334 A | 12/1994 | Sommese et al. |
| 5,660,687 A | 8/1997 | Allen et al. |
| 5,994,449 A | 11/1999 | Maslanka |
| 6,207,011 B1 | 3/2001 | Neculescu et al. |
| 6,426,383 B1 | 7/2002 | Fong et al. |
| 6,663,942 B1 | 12/2003 | Neculescu et al. |
| 6,894,110 B2 | 5/2005 | Fong et al. |
| 7,048,826 B2 | 5/2006 | Archer et al. |
| 7,404,875 B2 | 7/2008 | Clungeon et al. |
| 7,683,126 B2 | 3/2010 | Neal et al. |
| 7,902,312 B2 | 3/2011 | Gu et al. |
| 7,959,761 B2 | 6/2011 | Boettcher et al. |
| 8,101,045 B2 | 1/2012 | Furman et al. |
| 8,293,073 B2 | 10/2012 | Grigoriev et al. |
| 2004/0062907 A1* | 4/2004 | Lindsay ............... D21H 17/24 428/113 |
| 2004/0177940 A1 | 9/2004 | Archer et al. |
| 2005/0006040 A1 | 1/2005 | Boettcher et al. |
| 2005/0028954 A1 | 2/2005 | Neal et al. |
| 2005/0245669 A1 | 11/2005 | Clungeon et al. |
| 2007/0000631 A1 | 1/2007 | Grigoriev et al. |
| 2009/0145565 A1 | 6/2009 | Esser et al. |
| 2014/0110071 A1 | 4/2014 | Furman et al. |

FOREIGN PATENT DOCUMENTS

| | | |
|---|---|---|
| EP | 0942008 A1 | 9/1999 |
| JP | 06212596 A | 8/1994 |
| JP | 06235191 A | 8/1994 |
| KR | 1020100052498 A | 5/2010 |
| WO | 2006048131 A1 | 5/2006 |
| WO | 2007005577 A2 | 1/2007 |
| WO | WO 2007/136756 A2 | 11/2007 |
| WO | 2009017781 A2 | 2/2009 |
| WO | 2009017781 A3 | 3/2009 |
| WO | WO 2011/084996 A2 | 7/2011 |
| WO | 2014066176 A1 | 5/2014 |

\* cited by examiner

*Primary Examiner* — Satya Sastri

(74) *Attorney, Agent, or Firm* — Eric D. Babych; Brinks Gilson & Lione

(57) ABSTRACT

This invention is method of producing a creping cylinder adhesive comprising: contacting a dry form PVOH with a liquid form PVA at a temperature of less than 80° C., maintaining the PVOH and PVA at a temperature of between 90-95° C. until the PVOH is completely dissolved into a medium, and allowing the medium to cool to below 80° C.

16 Claims, No Drawings

METHOD OF PRODUCING CREPING ADHESIVE

CROSS-REFERENCE TO RELATED APPLICATIONS

This application is a divisional application of U.S. patent application Ser. No. 13/656,793 filed on Oct. 22, 2012, which issued as U.S. Pat. No. 9,266,301,which in turn is a continuation-in-part of U.S. patent application Ser. No. 11/172,079, filed on Jun. 30, 2005, which issued as U.S. Pat. No. 8,293,073, all of which are incorporated by reference in their entirety.

STATEMENT REGARDING FEDERALLY SPONSORED RESEARCH OR DEVELOPMENT

Not Applicable.

BACKGROUND OF THE INVENTION

This invention, relates to PVA compositions, useful in creping tissue paper. The desired properties of tissue paper, including softness, bulk, flexibility, and absorbency, are achieved by a process known as "creping". Typically, paper creping takes place on a heated creping cylinder (often referred to as a "Yankee Dryer") by the actions of a doctor blade. Creping is performed by transferring a wet paper sheet on to the creping cylinder's surface after it has been largely dewatered at a pressure roll nip. When first transferred, the non-water component of the sheet is about 35-90% of its mass. The sheet is further dried on the hot creping cylinder to achieve a non-water consistency of about 90-98% of its mass. The sheet then is removed from the creping cylinder by impact with the doctor blade. The mechanical action of the doctor blade results in a disruption of the fiber-fiber bonds in the sheet and forms microfold-structures within the sheet. These disruptions and microfold-structures produce many of the desired properties of tissue paper.

In order to crepe, the paper sheet must adhere to the surface of the creping cylinder. The adhesion is accomplished by the use of an adhesive coating applied to the creping cylinder. The most common adhesive coatings are synthetic polymers such as polyaminoamides, polyamides, polyamines, polyvinyl alcohols, polyvinyl acetates, polyacrylamides and polyethers. Various low molecular weight compounds are used to modify the coating properties. In order to function properly, an adhesive coating must have adequate: (i) uniformity, (ii) durability, and (iii) softness.

Uniformity of the coating is important for a few reasons. First, it affords consistent creping that affects the quality of the produced sheet. Also, it prevents direct exposure of the creping cylinder surface to the blade, which can lead to premature wear of the cylinder and the blade.

Durability is a characteristic of how well the coating remains on the creping cylinder's surface, particularly at the pressure roll nip. It is important because, if the coating is easily washed off, it exposes the creping cylinder and leads to excessive wear on the blade and the cylinder surface.

Softness is also important, because a coating that is too hard causes blade chatter. Blade chatter causes blade wear and non-uniform creping. Therefore, a coating which is uniform, durable, and soft is ideal.

The art described in this section is not intended to constitute an admission that any patent, publication or other information referred to herein is "Prior Art" with respect to this invention, unless specifically designated as such. In addition, this section should not be construed to mean that a search has been made, or that no other pertinent information, as defined in 37 CFR §1.56(a), exists.

BRIEF SUMMARY OF THE INVENTION

At least one embodiment of the invention is directed towards a method of preparing a composition of matter. The method comprises the steps of: contacting a dry form polyvinyl alcohol (PVOH) with a liquid form vinylamine/N-vinyl formamide copolymer (PVA) at a temperature of less than 80° C., maintaining the PVOH and PVA at a temperature of between 90-95° C. until the PVOH is completely dissolved into a medium, and allowing the medium to cool to below 80° C.

The dry form may be one item selected from the group consisting of powder, solid blocks, shavings, grindings, slices, moldings, congealed matter and any combination thereof. The liquid form may be one item selected from the group consisting of: a solution, a dispersion, an emulsion, a suspension, and any combination thereof. The medium may be a solution solvent.

The method may further comprise the step of adding, after the medium has cooled at least one item selected from the list consisting of: water-soluble polyols, modifiers, polyglycerol, preservatives, functional additives, water, and any combination thereof. The PVA may have been prepared by polymerizing 1 to 99 mole percent vinylamine monomer and about 99 to about 1 mole percent N-vinyl formamide monomer to form a copolymer, then reacting the copolymer with a halogenated organic acid. This reaction is characterized, at least in part, as causing a carboxyl carbon of the halogenated organic acid to become covalently bonded to an amino nitrogen of the copolymer.

The method may further comprise adding to the composition, after the medium has cooled, at least one item selected from the group consisting of a: plasticizer, humectant, oxidative stabilizer, inorganic phosphate, organic phosphate, release agent, lubricant, corrosion control agent, an inert fluorescent tracer, a crosslinking agent, and any combination thereof. The crosslinking agent may be selected from the group consisting of epihalohydrins, dialdehydes, diglycidyl ethers, and any combination thereof. The PVA may be crosslinked with another polymer selected from the group consisting of: polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof.

Prior to the medium cooling, additional monomers may be added to the medium, the monomers being substituent monomer units of another polymer selected from the list consisting of: polyvinyl acetate, vinyl alcohol-bearing polymers, vinyl acetate-bearing polymers, polyaminoamides, polyamides, polyamines, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof.

After the medium has cooled, an item may be added to the medium, the item selected from the group consisting of:

dialkyl imidazolinium quaternary salts, dialkyl diamidoamine quaternary salts, monoalkyl trimethylammonium quaternary salts, dialkyl dimethylammonium quaternary salts, trialkyl monomethylammonium quaternary salts, ethoxylated quaternary salts, dialkyl and trialkyl ester quaternary salts, polysiloxanes, quaternary silicones, organoreactive polysiloxanes, amino-functional polydimethylsiloxanes, and any combination thereof.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Bulk" means the inverse of the density of a tissue paper web, and is commonly expressed in units of $cm^3/g$. Bulk is another important part of real and perceived performance of tissue paper webs. Increases in bulk generally add to the cloth-like, absorbent perception of tissue paper. A portion of the bulk of a tissue paper web is imparted by creping.

"Copolymerized" means formed into a copolymer, a distinct polymer chain having at least two distinct kinds of substituent units and includes, but is not limited to alternating copolymers, periodic copolymers, statistical copolymers, random copolymers, block copolymers, terpolymers, stereoblock copolymers, and graft copolymers.

"Crosslinked" means at least one distinct polymer chain of substituent units, which is chemically attached to another distinct polymer chain of substituent units.

"Crepe Structure" means the folds and seams present on a paper product that has undergone a creping process.

"Degree of Hydrolysis" means the number of vinylformamide groups in a polymer converted to vinylamine groups by hydrolysis.

"Doctor Blade" means a blade that is positioned adjacent to another piece of equipment on which a material is disposed; the blade is constructed and arranged to impact the material and, thereby, help remove the material from the piece of equipment. Examples of materials include, but are not limited to, tissue webs, paper webs, glue, residual buildup, pitch, and combinations thereof. Examples of equipment include, but are not limited to, drums, plates, Yankee dryers, creping cylinders, and rolls.

"Dry Form" includes, but is not limited to, powder, solid blocks, shavings, grindings, slices, moldings, congealed matter and any combination thereof.

"Fiber" means an elongate particulate having an apparent length greatly exceeding its apparent width. More specifically, and as used herein, fiber refers to such fibers suitable for a papermaking process.

"High Molecular Weight Polymer" means a polymer with a weight average molecular weight of above 200,000 Daltons.

"Humectant" means a substance having affinity for water with stabilizing action on the water content of a material, a humectant keeps the moisture content caused by humidity fluctuations within a narrow range, humectants include but are not limited to low molecular weight water soluble polyols such as polyethylene glycol, propylene glycol, ethylene glycol, diethylene glycol, triethylene glycol, dipropylene glycol, glycerol, and polyglycerol.

"Inert" in the context of a fluorescent compound, means an object is not appreciably, or significantly affected, by chemicals it comes into contact with, or by the physical properties of equipment it comes into contact with.

"Liquid Form" includes, but is not limited to, a solution, dispersion, emulsion, suspension and any combination thereof.

"Low Molecular Weight Polymer" means a polymer with a weight average molecular weight of from about 1000 up to 200,000 Daltons.

"Modified by Reaction" means being so affected by a chemical reaction that two or more items become covalently bonded to each other.

"Not appreciably or significantly affected" in the context of a fluorescent compound, means that a fluorescent compound has undergone no more than a 10% change in its fluorescent signal.

"Paper Web" means any formed fibrous structure intermediate product of a papermaking process traditionally, but not necessarily, comprising cellulose fibers.

"Paper Sheet" means any formed fibrous structure end product, or intermediate product of a papermaking process, traditionally, but not necessarily, comprising cellulose fibers. Examples of end products include, but are not limited to, facial tissue, bath tissue, table napkins, copy paper, printer paper, writing paper, notebook paper, newspaper, paper board, poster paper, bond paper, cardboard, and the like.

"Paper Product" means any formed fibrous structure end product of a papermaking process, traditionally, but not necessarily, comprising cellulose fibers. Examples of such end products include, but are not limited to, facial tissue, bath tissue, table napkins, copy paper, printer paper, writing paper, notebook paper, newspaper, paper board, poster paper, bond paper, cardboard, and the like.

"Papermaking Process" means one or more processes for converting raw materials into various intermediate products and then into paper products; the process includes, but is not limited to, one or more of such steps as pulping, digesting, refining, drying, calendering, pressing, creping, dewatering, and bleaching.

"Polyalkylene Polyamine" is an organic compound having two primary amine ($-NH_2$) groups and at least one secondary amine group, where the amino nitrogen atoms are linked together by alkylene groups, provided no two nitrogen atoms are attached to the same carbon atoms. Polyalkylene polyamines include diethylenetriamine (DETA), triethylenetetraamine (TETA), tetraethylenepentaamine (TEPA), and, dipropylenetriamine.

"Polyols" means simple water-soluble compositions composed of alkylene groups and up to about six hydroxyl groups, in which the alkylene groups are optionally interrupted, by one or more O or NH groups.

"Plasticizer" means a substance which, when added to a material, causes an increase in the flexibility and workability of that material, often as a result of lowering the glass transition temperature of that material.

"PVA" means vinylamine/N-vinylformamide copolymer.

"PVOH" means polyvinyl alcohol.

"Release Aid" means a composition of matter, which reduces the adhesive properties of another composition it comes into contact with; it often includes a surfactant and can be oil based or non-oil based.

"SEC/MALLS" means size-exclusion chromatography combined with multiangle laser light scattering, a procedure which is described in more detail in the scientific paper: Combination of SEC/MALS experimental procedures and theoretical analysis for studying the solution properties of macromolecules, by Tarazona, M. P, et al; J. Biochem.

Bioph. Meth., vol. 56 pp. 95-116 (2003). This scientific paper is incorporated by reference in its entirety.

"Softness" means the tactile sensation perceived by the consumer, holding a particular product, rubbing it across skin, or crumpling it within a hand. This tactile sensation is provided by a combination of several physical properties. One of the most important physical properties related to softness is considered by those skilled in the art to be the stiffness of the paper web from which the product is made. Stiffness, in turn, is usually considered to be directly dependent on the strength of the web.

"Strength" means the ability of a paper web, sheet, or product, to maintain physical integrity and to resist tearing, bursting, and shredding under use conditions.

"STP" means standard temperature and pressure; it approximates the freezing temperature of water and atmospheric pressure at sea level, STP is 0° C. (32° F. or 273 Kelvin) and 1 atm (101.335 kPa, 14.7 PSI, 760 mm Hg, 760 Torr, or otherwise referred to as 1 Bar for pressure gauge labeling).

"TAD" means through air-drying process, a process in which a molded paper sheet is carried along with a fabric or other material belt through which hot air can pass to dry the sheet. This process allows the sheet to be dried, while preserving its bulk and softness.

The methods and compositions described in this application can be used to increase adhesion of a tissue sheet to a creping cylinder in a creping process. At least one embodiment of the invention is directed to a method of creping in which a paper web adheres to a creping cylinder using an adhesive composition comprising PVA.

In at least one embodiment, prior to being applied to the cylinder, the web is pre-dried on a TAD belt. The drastic reduction in web moisture content that results from first pre-drying a web on a TAD belt and then applying the web to a creping cylinder can lead to a loss in adhesive properties of the coating. As a result prior art adhesive compositions are often ineffective when used in such conditions. However, the compositions of this invention show effective performance even under these difficult conditions.

In at least one embodiment, the PVA polymers are prepared by polymerization of N-vinylformamide under free radical forming conditions followed by acid or base hydrolysis of a portion of the N-vinylformamide's amide groups into amine groups. By controlling the stoichiometry of the hydrolyzing agent, it is possible to prepare PVA polymers containing the desired vinylamine/N-vinylformamide ratio.

In an embodiment, the PVA polymers have a weight average molecular weight of about 100,000 to about 500,000 Daltons.

In an embodiment, the PVA polymers have a weight average molecular weight of about 300,000 to about 400,000 Daltons.

In an embodiment, the PVA polymers are composed of about 1 to about 99 mole percent vinylamine monomer and about 99 to about 1 mole percent N-vinylformamide monomer.

In an embodiment, the PVA containing composition has a pH of between 6.5 and 8, preferably it has a pH of between 7 and 7.5. The pH of the PVA polymers can be adjusted to the desired range by acid addition. Representative acids suitable for this purpose include, but are not limited to one or more of: sulfuric, hydrochloric, phosphoric, formic, acetic, and any combination thereof.

In at least one embodiment the composition comprises a blend of a first PVA polymer with at least one other PVA polymer.

In at least one embodiment, the composition comprises a blend of one or more PVA polymers and another polymer. The other polymer may contain one or more of the constituent monomers of polymers selected from the group of polymers consisting of: polyvinyl alcohol, polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof.

In at least one embodiment, the blend comprises at least one high molecular weight polymer and one low molecular weight polymer.

In at least one embodiment, the PVA polymer(s) and/or one or more of the other previously-listed polymers are blended when in a dry form. In at least one embodiment the PVA polymer(s) and/or one or more of the other previously listed polymers are blended when in a liquid form.

In at least one embodiment, the blend comprises one or more of: liquid form PVA blended with liquid form PVOH, dry form PVA blended with liquid form PVOH, liquid form PVA blended with dry form PVOH, dry form PVA blended with dry PVOH, and any combination thereof.

In at least one embodiment, the PVOH is contacted with the PVA within a medium at a temperature of less than 80° C. The PVOH and PVA are maintained at a temperature of between 90-95° C. until both completely dissolve into the medium. The medium is cooled to below 80° C. or to room temperature.

In at least one embodiment the following procedure is used: A dry form PVOH is contacted with a liquid form PVA at a temperature of less than 80° C. The PVOH and PVA are maintained at a temperature of between 90-95° C. until the PVOH completely dissolves into a medium. The medium is cooled to below 80° C. or to room temperature.

In at least one embodiment, the composition comprises at least one PVA polymer, which is crosslinked with another polymer selected from the group consisting of: another PVA polymer, PVOH, polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof.

In at least one embodiment, the PVA polymers are reacted with about 1 to about 10 percent, based on polymer actives, of one or more crosslinkers.

In at least one embodiment, the cross linking is achieved with a crosslinking agent selected from the group consisting of epihalohydrins, dialdehydes diglycidyl ethers, polyethyleneglycol diglycidyl ether (PEGDGE), trimethylolpropane triglycidyl ether (TMPTE), glycerol propoxylate triglycidyl ether, glycerol triglycidyl ether, N,N-diglcylidylaniline, tris (2,3-epoxypropyl)isocyanurate, and the like, and any combination thereof.

In at least one embodiment, the reaction with crosslinkers is accomplished by heating an aqueous solution of the first PVA polymer and the other polymer and cross-linker from an initial temperature of about 20° C. to at least 100° C.

In at least one embodiment, the PVA polymers reacted with the crosslinkers have a weight average molecular weight of about 10,000 to about 100,000 Daltons, preferably 30,000 to about 60,000 Daltons.

In at least one embodiment, the composition comprises an additional agent selected from the group consisting of: plasticizers, humectants, oxidative stabilizers, inorganic phosphates, organic phosphates, release agents, lubricants, corrosion control agents, and any combination thereof.

In at least one embodiment, the composition comprises an inert fluorescent tracing agent. Such a tracing agent may facilitate the determination of whether and how much of the composition or a constituent thereof (including but not limited to one or more of the aforementioned additional agents) actually ends up adhering to the creping cylinder.

Use of the inert fluorescent tracing agent may comprise the steps of: a) adding a known amount of an inert fluorescent tracer to a target material (such as a known amount of PVA, PVOH, and/or additional agent(s) or material(s)), b) applying the target material to a creping cylinder; c) using a fluorometer to measure the fluorescent signal of the inert fluorescent tracer on the creping cylinder; d) using the fluorescent signal of the inert fluorescent tracer to determine the amount of inert fluorescent tracer present on the creping cylinder; e) correlating the amount of inert fluorescent tracer present on the creping cylinder with the amount of target material on the creping cylinder; f) comparing the amount of target material on the creping cylinder with the desired amount of agent that is supposed to be present on the creping cylinder; and optionally g) adjusting the amount of target material present on said creping cylinder, based on the measured fluorescent signal of the inert fluorescent tracer.

Suitable inert fluorescent tracers include, but are not limited to, 1,5-naphthalenedisulfonic acid disodium salt (1,5-NDSA), 2-amino-1-naphthalenesulfonic acid, 5-amino-2-naphthalenesulfonic acid, 4-amino-3-hydroxyl-1-naphthalenesulfonic acid, 6-amino-4-hydroxyl-2-naphthalenesulfonic acid, 7-amino-1,3-naphthalenedisulfonic acid, potassium salt, 4-amino-5-hydroxy-2,7-naphthalenedisulfonic acid, 5-dimethylamino-1-naphthalenesulfonic acid, 2,6-naphthalenedicarboxylic acid, dipotassium salt, 2-anthracenesulfonic acid, sodium salt, quinoline (CAS Registry No. 91-22-5), 1-ethylquinaldinium iodide, dibenzofuransulfonic acid, Brilliant Acid Yellow 8G (CAS Registry No. 2391-30-2, i.e. Lissamine Yellow FF, Acid Yellow 7), cresyl violet acetate (CAS Registry No. 10510-54-0), Safranine O (CAS Registry No. 477-73-6), bathophenanthrolinedisulfonic acid disodium salt (CAS Registry No. 52746-49-3), Titan Yellow (CAS Registry No. 1829-00-1, i.e. Thiazole Yellow G), Celestine Blue (CAS Registry No. 1562-90-9), Sandoz CW (CAS Registry No. 56509-06-9, i.e. Flu. Bright, 235), Sandoz CD (CAS Registry No. 16470-24-9, i.e. Flu. Bright. 220), Sandoz TH-40 (CAS Registry No. 32694-95-4), Tinopal 5BM-GX (CAS Registry No. 169762-28-1), Keyfluor White ST (CAS Registry No. 144470-48-4, i.e. Flu. Bright. 28), Phorwite CL (CAS Registry No. 12270-53-0, i.e. Flu. Bright. 191), Phorwite BKL (CAS Registry No. 61968-72-7, i.e. Flu. Bright. 200), Leucophor BSB (CAS Registry No. 68444-86-0, i.e. Leucophor AP, Flu. Bright. 230), Leucophor BMB (CAS Registry No. 16470-24-9, i.e. Leucophor U, Flu. Bright. 290), Keyfluor White CN (CAS Registry No. 16470-24-9), Tinopol DCS (CAS Registry No. 205265-33-4), 1-amino-4-naphthalene sulfonic acid, 1-amino-7-naphthalene sulfonic acid, amino 2,5-benzene disulfonic acid, 1,3,6,8-pyrenetetrasulfonic acid, tetrasodium salt, 8-hydroxy-1,3,6-pyrenetrisulfonic acid, trisodium salt (i.e. Pyranine), 3,4,9,10-perylenetetracarboxylic acid, bis-N-methylacridinium (i.e. Lucigenin), 2-(4-aminophenyl)-6-methylbenzothiazole, fluorescein (CAS Registry No. 2321-07-5, i.e. Acid Yellow 73, Uranine), Sulforhodamine B (CAS Registry No. 3520-42-1, i.e. Acid Red 52), Rhodamine WT (CAS Registry No. 37299-86-8), Resazurin (CAS Registry No. 550-82-3), Rhodalux (CAS Registry No. 550-82-3), Anthrasol Green IB (CAS Registry No. 2538-84-3, i.e. Solubilized Vat Dye), Acridine Orange (CAS Registry No. 65-61-2), Phorwite BHC 766 (CAS Registry No. 52237-03-3), Tinopal CBS-X (CAS Registry No. 27344-41-8), Tinopal RBS 200, Pylaklor White S-15A (CAS Registry No. 6416-68-8) and their ammonium, potassium and sodium salts.

The selection of which inert fluorescent tracer to use may be based on matching the fluorescent tracer to the target material. The method used to select the optimum inert fluorescent tracer may be to use a fluorimeter to detect whatever fluorescent signals are present on a creping cylinder coated with a target material. Then an inert fluorescent tracer may be added to the target material. A fluorimeter may be used to detect its fluorescent signal on the creping cylinder that the target material is placed in. If it is not possible to detect the fluorescent signal of the inert fluorescent tracer, due to background fluorescence, or interference from the fluorescent signal of the target material itself, then either more inert fluorescent tracer may be used, or an alternative inert fluorescent tracer can be selected for use with that target material. Ideally an inert fluorescent tracer is selected such that its excitation and emission wavelengths are different than those of the background fluorescent signal(s) and the fluorescent signal of the target material. In at least one embodiment the fluorimeters is constructed and arranged to detect and measure the fluorescent signal from the inert fluorescent tracer used.

In at least one embodiment, the PVA is modified by reaction according to the following scheme:

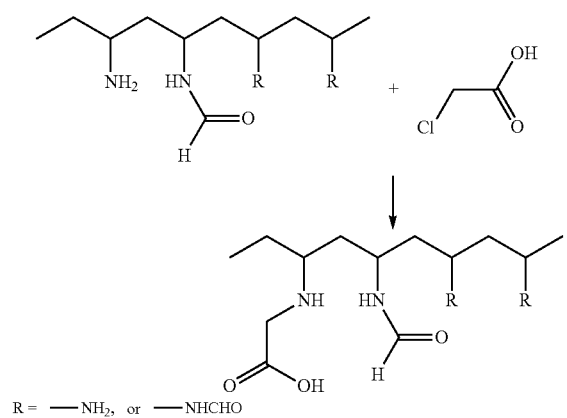

A halogenated organic acid modifies the PVA polymer by reaction to attach the carbonyl carbon of the acid covalently to an amino nitrogen component of the polymer. In at least one embodiment, the polymer has the above structure and is formed by a reaction other than a Michael Addition or halogenated organic acid modification.

Although halogenated organic acids have in the past been used with amine bearing polymers, as the following reaction scheme demonstrates, they only involved adding a proton to a secondary amine group creating a cation, resulting in an ionic complex reaction. As a result the prior art only describes an ionic reaction not the inventive covalent one.

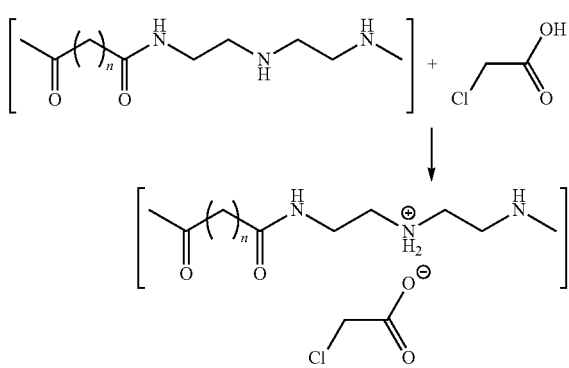

In at least one embodiment, PVA polymers and/or crosslinked PVA polymers are modified by reaction with one or more halogenated organic acids of formula X—R—CO$_2$M, where X is F, Cl, Br or I, R is alkyl or alkylaryl and M is H or an alkaline or alkaline earth metal or an ammonium counterion including lithium, sodium, potassium, calcium, ammonium, and the like. Alkyl groups may be straight or branched and, typically, contain 1 to about 6 carbon atoms. Aryl groups are, typically, phenyl, optionally substituted with one or more halogen, alkyl, alkoxy or hydroxyl groups.

Representative halogenated organic acids include any one or more of: chloroacetic acid, 4-(chloromethyl)benzoic acid, 2-chloropropionic acid, 3-chloropropionic acid, bromoacetic acid, 2-bromobutyric acid, 3-bromobutyric acid, 4-bromobutyric acid, α-bromoisobutyric acid, and their salts.

In an embodiment, the adhesive composition of this invention further comprises one or more water-soluble polyols. Representative water-soluble polyols include one or more of: glycerol, ethylene glycol, 1,4-butanediol, diethanolamine, triethanolamine, sorbitol, diethylene glycol, triethylene glycol, propylene glycol, dipropylene glycol, polyethylene glycol, and polyglycerols.

The amount of water soluble polyols in relation to the PVA polymers on a dry polymer basis typically may range from about 5 to 95 percent by weight. In an embodiment, it is desirable to use between about 10-75 percent by weight of the water soluble polyol. It is to be understood that not all of the water soluble polyols produce similar results.

The adhesive compositions of the present invention may be applied to the surface of a creping cylinder as a dilute aqueous solution. In an embodiment, the aqueous solution includes from 0.01 to about 10.0 weight percent, alternatively 0.05 to about 5.0 weight percent, or 0.1 to 1.0 weight percent. Those skilled in the art of creping adhesives will appreciate that, under certain circumstances, the reason for such variations in the amount of water in the admixture is, in part, based on the need to deposit only a very thin layer of adhesive on the creping cylinder. In at least one embodiment, depositing a very thin layer of adhesive on the creping cylinder is accomplished by spraying the composition onto the creping cylinder.

Such spraying may be accomplished by a variety of methods, for example by using spraybooms designed for double or triple coverage, by oscillating the sprayboom and by recirculation of the diluted creping composition from the outlet of the sprayboom to improve mixing and reduce the possibility of separation.

In an embodiment, a release aid that is also in aqueous form is applied to the creping cylinder along with the composition. The release aid provides lubrication between the creping cylinder surface and the doctor blade used to crepe the tissue paper from the creping cylinder. The release aid also allows the tissue paper to release from the adhesive during the creping process. Representative release aids include one item selected from the group consisting of: release oils, emulsifying surfactants, and any combination thereof. Representative release oils may comprise one or more of: naphthenic oil, paraffinic oil, vegetable oil, mineral oil, synthetic oil, and any combination thereof.

In order to form stable aqueous dispersions, the release aid may be formulated with one or more surfactants such as fatty acids, alkoxylated alcohols, alkoxylated fatty acids, and the like. The release aid may be applied to the creping cylinder before or after the adhesive composition, or may be formulated with the adhesive for application to the creping cylinder.

The adhesive compositions of this invention may be used in combination with functional additives used in the art to improve the softness of the tissue or towel. Representative functional additives include organic quaternary salts having fatty chains of about 12 to about 22 carbon atoms, including dialkyl imidazolinium quaternary salts, dialkyl diamidoamine quaternary salts, monoalkyl trimethylammonium quaternary salts, dialkyl dimethylammonium quaternary salts, trialkyl monomethylammonium quaternary salts, ethoxylated quaternary salts, dialkyl and trialkyl ester quaternary salts, and any combination thereof. Additional suitable functional additives include polysiloxanes, quaternary silicones, organoreactive polysiloxanes, amino-functional polydimethylsiloxanes, and any combination thereof.

EXAMPLES

The foregoing may be better understood by reference to the following examples, which are presented for purposes of illustration and are not intended to limit the scope of the invention. In particular, the examples demonstrate representative examples of principles innate to the invention and these principles are not limited to the specific condition recited in these examples. As a result, it should be understood that the invention encompasses various changes and modifications to the examples described herein, and such changes and modifications can be made without departing from the spirit and scope of the invention and without diminishing its intended advantages. It is intended, therefore, that such changes and modifications be covered by the appended claims.

Experiments were conducted to blend PVOH with PVA to produce stable and useful products for the tissue creping application. As a representative example, a solution was prepared containing 136.36 g of a commercially available PVA product (Lupamin 9030 available from BASF, Mount Olive, N.J.) which contains vinylamine and N-vinylformamide in a ratio of 30:70, respectively, and has a MW of 340 kDa. The PVA was placed within 98.64 g of deionized water and mixed at 800-1000 rpm. Under continued mixing, 15 g of dry powdered commercially available PVOH (Celvol 523 available from Sekisui Specialty Chemicals, Dallas Tex.) was added to the mixture. The mixture was heated to 90-95° C. and held at that temperature until the PVOH was dissolved completely. The solution was cooled to room temperature, at which point water-soluble polyols and polyglycerol were added.

Mixtures prepared in this fashion are unexpectedly stable when compared to simple blends of PVOH with PVA. For example, a mixture of an aqueous solution of PVA polymer blended with an already-dissolved and liquid PVOH phase separated within 2 days. When the same PVOH-PVA blend was prepared according to the above described method, the blend remained in the same stable unitary phase for over 9 months.

Furthermore, the blends of PVA with PVOH prepared according to this invention showed improved adhesion characteristics for the creping application. Peel adhesion was tested by means of a wet tack peel adhesion test. This test measured the force required to peel a cotton cloth from a heated metal plate. First, a film of the adhesive composition was applied to the metal panel by means of a #40 coating rod. The adhesive was applied to the panel contained 15% active components. The metal plate was heated to 100° C. and at this point a wet cotton cloth was pressed into the film by means of a 1.9 kg cylindrical roller. After the cloth was applied, the metal plate was placed in an oven at a temperature of 105° C. It remained in the oven for 15 minutes to dry the cloth. The metal plate was clamped in a tensile testing apparatus. One end of the cotton cloth was clamped in the pneumatic grip of the tester and the cloth was peeled from the panel at an angle of 180° and at a constant speed. During the peeling, the temperature of the metal plate was maintained at 100° C.

This process was performed using cotton cloths with different moisture contents to simulate different sheet moistures that may result from TAD pre-drying of a sheet. Higher normalized peel adhesion values represent improved adhesion. It can be seen in Table I that the blends of this invention produced according to the above described method provided consistently higher peel adhesion values compared with simple blends of the two separate polymer solutions. In addition, strong adhesion was present even in the presence of lower cloth moisture contents. This is particularly advantageous in the TAD process, where sheet moistures, when contacted with the creping cylinder, are lower than in conventional creping processes.

TABLE I

| Cloth Moisture | Normalized peel adhesion | |
| --- | --- | --- |
| (%) | Inventive Mixture | Simple Blend |
| 14 | 11 | — |
| 24 | 17 | 4 |
| 31 | 23 | 2 |
| 47 | 26 | 4 |
| 59 | 55 | 41 |

Additional experiments were performed to evaluate blends of PVA polymers having different molecular weights and degrees of hydrolysis. Again, the blends were evaluated to determine their effectiveness under the low moisture conditions prevalent in a post-TAD drying creping process. The two particular blends evaluated were labeled PVA-A and PVA-B. PVA-A had a MW of 300 kDa, as determined by SEC/MALLS, while PVA-B had a MW of 73 kDa as determined by SEC/MALLS. Furthermore, PVA-A had a degree of hydrolysis of 30%, while PVA-B had a degree of hydrolysis of 70%.

The peel adhesion data provided in Table II shows how blends of PVA polymers, having differing MW and degrees of hydrolysis, can be used to maximize adhesion for different creping processes. For example, in post-TAD creping processes where the sheet moisture coming to the creping cylinder is low (see the example of a moisture content of 14% in Table II), blending of lower MW and higher degree of hydrolysis PVA-B with PVA-A, resulted in an increase in adhesion.

TABLE II

| Moisture (%) | PVA-A (%) | PVA-B (%) | Adhesion (g/in) |
| --- | --- | --- | --- |
| 14 | 100 | 0 | 51 |
| 14 | 75 | 25 | 117 |
| 14 | 50 | 50 | 182 |
| 14 | 0 | 100 | 296 |
| 31 | 100 | 0 | 520 |
| 31 | 75 | 225 | 461 |
| 31 | 50 | 50 | 475 |
| 31 | 0 | 100 | 428 |
| 59 | 100 | 0 | 309 |
| 59 | 75 | 25 | 200 |
| 59 | 50 | 50 | 308 |
| 59 | 0 | 100 | 160 |

Although this invention may be embodied in many different forms, there are described in detail herein specific preferred embodiments of the invention. The present disclosure is an exemplification of the principles of the invention and is not intended to limit the invention to the particular embodiments illustrated. Furthermore, the invention encompasses any possible combination of some or all of the various embodiments mentioned herein, described herein and/or incorporated herein. In addition, the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims, where the term "comprising" means "including, but not limited to." Those familiar with the art may recognize other equivalents to the specific embodiments described herein, which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g., 1 to 6.1), and ending with a maximum value of 10 or less, (e.g., 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified. Unless otherwise indicated herein, molecular weight or MW refers to molecular weight as measured by weight average.

This completes the description of the preferred and alternate embodiments of the invention. Those skilled in the art may recognize other equivalents to the specific embodiment described herein, which equivalents are intended to be encompassed by the claims attached hereto.

What is claimed is:

1. A method of preparing a composition of matter, the method comprising the steps of:
   contacting a dry form polyvinyl alcohol (PVOH) with a liquid form vinylamine/N-vinyl formamide copolymer (PVA) at a temperature of less than 80° C., raising the temperature of the PVOH and PVA to a temperature ranging from 90° C. to 95° C. and maintaining this temperature until the PVOH is completely dissolved into a medium, and cooling the medium to below 80° C.

2. The method of claim 1, wherein the dry form is selected from the group consisting of a powder, a solid block, a shaving, a grinding, a slice, a molding, congealed matter and any combination thereof.

3. The method of claim 1, wherein the liquid form is selected from the group consisting of: a solution, a dispersion, an emulsion, a suspension, and any combination thereof.

4. The method of claim 1, wherein the medium is water.

5. The method of claim 1, further comprising the step of adding, after the medium has cooled, an additive selected from the list consisting of: a water-soluble polyol, a preservative, a functional additive, water, and any combination thereof.

6. The method of claim 1, wherein the PVA was prepared by polymerizing N-vinylformamide monomers and then hydrolyzing at least one amide group of the resulting polymer with an acid or a base, wherein the PVA comprises about 1 to 99 mole percent vinylamine monomer and about 99 to about 1 mole percent N-vinyl formamide monomer.

7. The method of claim 1, further comprising adding to the composition after the medium has cooled, an additive selected from the group consisting of: a plasticizer, a humectant, an oxidative stabilizer, an inorganic phosphate, an organic phosphate, a release agent, a lubricant, a corrosion control agent, and any combination thereof.

8. The method of claim 1, further comprising adding a fluorescent tracer to the composition after the medium has cooled.

9. The method of claim 1, further comprising adding a crosslinking agent to the composition after the medium has cooled.

10. The method of claim 9, wherein the crosslinking agent is selected from the group consisting of an epihalohydrin, a dialdehyde diglycidyl ether, and any combination thereof.

11. The method of claim 9, further comprising adding to the composition an additional polymer selected from the group consisting of: polyvinyl alcohol, polyvinyl acetate, polyaminoamide, polyamide, polyamine, crosslinked polyaminoamide, polyethyleneimine, polyacrylamide, glyoxylated polyacrylamide, polyacrylate, polymethylmethacrylate, starch, carboxymthylcellulose, polyether, vinyl amine/acrylamide copolymer, vinylamine/acrylate copolymer, polyvinylpyrrolidone, synthetic protein, natural protein, and any combination thereof.

12. The method of claim 1, further comprising adding a polymer selected from the group consisting of: polyaminoamide, polymide, polyamine, polyethyleneimine, polyacrylamide, glyoxylated polyacrylamide, polyacrylate, polymethylmethacrylate, starch, carboxymthylcellulose, polyether, vinyl amine/acrylamide copolymer, vinylamine/acrylate copolymer, polyvinylpyrrolidone, synthetic protein, natural protein, and any combination thereof, wherein the polymer is added before cooling the medium.

13. The method of claim 1, wherein essentially all of the PVOH and PVA have remained in a same liquid phase for over 8 months.

14. The method of claim 1, further comprising adding to the composition, after the medium has cooled, an additive selected from the group consisting of: a dialkyl imidazolinium quaternary salt, a dialkyl diamidoamine quaternary salt, a monoalkyl trimethylammonium quaternary salt, a dialkyl dimethylammonium quaternary salt, a trialkyl monomethylammonium quaternary salt, an ethoxylated quaternary salt, a dialkyl and trialkyl ester quaternary salt, a polysiloxanes, a quaternary silicone, an organoreactive polysiloxane, an amino-functional polydimethylsiloxane, and any combination thereof.

15. The method of claim 1, further comprising adding a polymer to the medium selected from the group consisting of: polyvinyl alcohol, polyvinyl acetate, polyaminoamide, polyamide, polyamine, polyethyleneimine, polyacrylamide, glyoxylated polyacrylamide, polyacrylate, polymethylmethacrylate, starch, carboxymthylcellulose, polyether, vinyl amine/acrylamide copolymer, vinylamine/acrylate copolymer, polyvinylpyrrolidone, synthetic protein, natural protein, and any combination thereof, wherein the polymer is added after raising the temperature of the PVOH and PVA.

16. The method of claim 5, wherein the water-soluble polyol is polyglycerol.

* * * * *